United States Patent
Seo et al.

(10) Patent No.: US 7,077,523 B2
(45) Date of Patent: Jul. 18, 2006

(54) THREE-DIMENSIONAL DISPLAY USING VARIABLE FOCUSING LENS

(75) Inventors: Cheong Soo Seo, Seoul (KR); Dong Woo Gim, Gyoungnam (KR); Gyoung Il Cho, Seoul (KR); James Greenup Boyd, Brenham, TX (US); Sang Hyune Baek, Suwon (KR)

(73) Assignees: Angstorm Inc., Suwon (KR); Stereo Display Inc., Fullerton, CA (US)

( * ) Notice: Subject to any disclaimer, the term of this patent is extended or adjusted under 35 U.S.C. 154(b) by 23 days.

(21) Appl. No.: 10/778,281

(22) Filed: Feb. 13, 2004

(65) Prior Publication Data

US 2005/0179868 A1    Aug. 18, 2005

(51) Int. Cl.
 G03B 21/00    (2006.01)
 G03B 21/20    (2006.01)
 G02B 26/00    (2006.01)
 G02B 27/14    (2006.01)
 G02B 5/08     (2006.01)

(52) U.S. Cl. .......... 353/10; 353/102; 353/122; 359/292; 359/619; 359/631; 359/633; 359/851

(58) Field of Classification Search ........... 353/10, 353/122, 102; 359/290–292, 15, 619, 625–627, 359/630, 631, 633, 666, 851; 349/95; 396/18
See application file for complete search history.

(56) References Cited

U.S. PATENT DOCUMENTS

| | | | |
|---|---|---|---|
| 2,002,376 A | 5/1935 | Manfred | 40/130 |
| 4,834,512 A | 5/1989 | Austin | 350/419 |
| 5,897,195 A * | 4/1999 | Choate | 362/33 |
| 5,986,811 A * | 11/1999 | Wohlstadter | 359/626 |
| 6,111,900 A | 8/2000 | Suzudo | 372/22 |
| 6,658,208 B1 * | 12/2003 | Watanabe et al. | 396/89 |
| 6,833,938 B1 * | 12/2004 | Nishioka | 359/15 |
| 2002/0102102 A1 | 8/2002 | Watanabe et al. | 396/89 |
| 2005/0057812 A1 * | 3/2005 | Raber | 359/619 |
| 2005/0225884 A1 * | 10/2005 | Gim et al. | 359/851 |

OTHER PUBLICATIONS

Kaneko et al., 2000, "Quick Response Dynamic Focusing Lens using Multi-Layered Piezoelectric Bimorph Actuator," Proceeding of SPIE vol. 4075; 24-31.
Cho, 2003, "Fast-response Variable Focusing Micromirror Array Lens," Proceeding of SPIE vol. 5055: 278-286.

* cited by examiner

*Primary Examiner*—Melissa Jan Koval
(74) *Attorney, Agent, or Firm*—John K. Park; Park Law Firm (57) ABSTRACT

A three-dimensional display device includes a two-dimensional display displaying a first image, and a variable focusing lens receiving light from the two-dimensional display and forming a second image. The variable focusing lens reflects light from the two-dimensional display. The first image includes a predetermined number of first depthwise images that are displayed within a unit time, and the second image includes corresponding second depthwise images. Each depthwise image represents the portion of the first image having the same image depth, and the two-dimensional display displays one depthwise image at a time. The focal length of the variable focusing lens changes according to the depth of the depthwise image being displayed. A micromirror array lens is used as the variable focusing lens. The micromirror array lens has enough speed and focusing depth range for realistic three-dimensional display.

12 Claims, 6 Drawing Sheets

THREE-DIMENSIONAL DISPLAY USING VARIABLE FOCUSING LENS

BACKGROUND OF THE INVENTION

The present invention relates to a method and a device for three-dimensional display. More particularly, this invention relates to a method and a device for three-dimensional display using a variable focusing lens combined with a two-dimensional display.

The most popular method for three-dimensional display by prior art is one using the binocular parallax phenomenon. This method utilizes the principle that the human brain perceives a three-dimensional image when each eye sees one of two images that are measured at different angles. This method does not actually generate a three-dimensional image in the space. Rather, parallax by the observer's eyes is utilized. Therefore, this method has disadvantages that various factors including arbitrary distribution of the viewer's position, binocular disparity due to deviations in the distance between the two eyes, vergence, fatigue accumulation in the eye, accommodation, watching by more than one viewers, the relative position change of the three-dimensional image due to viewer's movement, etc., are involved, and such factors must be considered in order to provide proper three-dimensional display.

Holography is a three-dimensional display method that generates a real image in the space. Holography has been used for three-dimensional image display very limitedly due to its technical complexity and high manufacturing cost.

U.S. Pat. No. 4,834,512 to Austin discloses a 3D display having a 2D display, a fluid-filled variable focusing lens, and control means for controlling the display and the lens. The 2D display sequentially presents 2D images representative of the cross sections of an object at different depths. The fluid-filled variable focusing lens is disposed in front of the 2D display and has a membrane that responds to the pressure of the fluid within the lens. Austin's display has a disadvantage that since the focus changing speed of the fluid-filled lens is slow, the display is unsuitable for displaying realistic 3D images.

U.S. Pat. No. 5,986,811 to Wohlstadter discloses an imaging method and system for creating 3D image from a 2D image having a plurality of image points. The imaging system includes an array of micro-lenses having variable focusing length, and means for holding the micro-lenses in alignment with the image points of the 2D display.

New three-dimensional image display method and device, which can meet requirements related to eye fatigue, watching by more than one viewers, practicality of the relative distance between a three-dimensional image and the viewer, 2D/3D compatibility or exchangeability, color expression and resolution that equal or exceed those of HDTV, low manufacturing cost, and no significant data amount increase, have long been in need.

SUMMARY OF THE INVENTION

The present invention contrives to solve the disadvantages of the prior art.

An objective of the invention is to provide a three-dimensional display device that has a simple construction and realistic image representation.

Another objective of the invention is to provide a three-dimensional display device and method that utilize a set of depthwise images.

Still another objective of the invention is to provide a three-dimensional display device that can display a large range of image depth.

Still another objective of the invention is to provide a three-dimensional display device that provide a large image size.

To achieve the above objectives, a three-dimensional display device according to the first embodiment of the invention includes a two-dimensional display displaying a first image, and a variable focusing lens receiving light from the two-dimensional display and forming a second image. The first image includes a predetermined depth number of first depthwise images that are displayed within a unit time, and the second image includes corresponding second depthwise images. Each of the first depthwise images represents the portion of the first image having the same image depth, and the two-dimensional display displays one first depthwise image at a time. The focal length of the variable focusing lens changes according to the depth of the first depthwise image being displayed. The focusing speed of the variable focusing lens is at least equal to the product of the afterimage speed of the human eye and the depth number so that the second image looks three-dimensional to the viewer. The variable focusing lens reflects light from the two-dimensional display.

The variable focusing lens is made of a micromirror array lens. The micromirror array lens includes many micromirrors. The micromirrors are arranged in a flat plane to form one or more concentric circles in the flat plane. In particular, the micromirror array lens forms a reflective Fresnel lens. Each micromirror is controlled to change the focal length of the variable focusing lens by controlling its translational motion, by controlling its rotational motion, or by controlling both of its translational motion and rotational motion.

The micromirror array lens is suitable for the three dimensional display device of the present invention in that it has a fast focus change speed, large range of focal length, and that it can be made to have a large aperture.

Since the micromirror array lens is reflective, it cannot be positioned linearly with respect to the two-dimensional display and the viewer. Instead, a beam splitter is positioned in the path of light between the two-dimensional display and the variable focusing lens. Alternatively, the variable focusing lens is positioned so that the path of the light reflected by the variable focusing lens is not blocked by the two-dimensional display.

The three-dimensional display device may further include an auxiliary lens having a predetermined focal length, and the second image is formed by the variable focusing lens and the auxiliary lens together. The auxiliary lens has the role of changing or extending the range of variable focal length of the device, or increasing the size of a screen of the three-dimensional display.

The invention also provides a three-dimensional display method. The method includes the steps of displaying a first depthwise image in two-dimension, displaying a second depthwise image by receiving light from the displayed first depthwise image and focusing the light according to the depth of the first depthwise image, and repeating the above two steps for a predetermined number of the first depthwise images within a unit time. The first depthwise images form a first image, and each of the first depthwise images represents the portion of the first image having the same image depth. The displayed second depthwise images form a second image that looks three-dimensional for a viewer.

The focusing speed in the step of displaying the second depthwise image is at least equal to the product of the afterimage speed of the human eye and the number of depths. In the step of displaying the second depthwise image, the light received from the displayed first depthwise image is reflected.

The step of displaying the second depthwise image is performed with a micromirror array lens.

In the second embodiment, the two-dimensional display includes many pixels, and the variable focusing lens includes many variable focusing lenses. Each of the variable focusing lenses corresponds to each of the pixels. The focal length of each of the variable focusing lenses changes according to the image depth of an image displayed by each of the pixels. Each of the variable focusing lenses is made of a micromirror array lens. The focusing speed of the variable focusing lens is at least equal to the afterimage speed of the human eye, and each of the variable focusing lenses reflect light from the two-dimensional display.

For both embodiments, the focal length of the variable focusing lens may be controlled to be fixed so that the three-dimensional display device can be used as a two-dimensional display device. By fixing the focal length of the variable focal lens, and the two-dimensional display displaying the usual two-dimensional images, it is easy to convert the three-dimensional display device between two-dimensional display and three-dimensional display.

The advantages of the present invention are: (1) since the three-dimensional display device actually generates three-dimensional images in the space, the device does not suffer from the disadvantage of prior art device using parallax including imaging difficulties due to considerations for arbitrary distribution of the viewer's position, and binocular disparity due to deviations in the distance between the two eyes, vergence, accommodation, watching by more than one viewers, and the relative position change of the three-dimensional image due to viewer's movement; (2) the cost for providing three-dimensional image data is inexpensive since the data needs only depth information in addition to two-dimensional image information, and thus there is no significant increase in data amount; and (3) the device can be easily converted to a two-dimensional display and vice versa.

Although the present invention is briefly summarized, the full understanding of the invention can be obtained by the following drawings, detailed description and appended claims.

DESCRIPTION OF THE FIGURES

These and other features, aspects and advantages of the present invention will become better understood with reference to the accompanying drawings, wherein:

FIG. 8b is a schematic diagram showing that micromirror array lens is used as the variable focusing lens for the device of FIG. 8a.

DETAILED DESCRIPTION OF THE INVENTION

FIGS. 1a–1d illustrate the general principle regarding the distance or depth of an image formed by a lens, and the focal length of the lens. When the light from an object passes through a lens, it converges or diverges depending on the distance L between the object and the lens, and the focal length of the lens. In the description of the present invention, a lens means an optical element that focuses light, and is not confined to a refractive type lens.

Figure 1A:
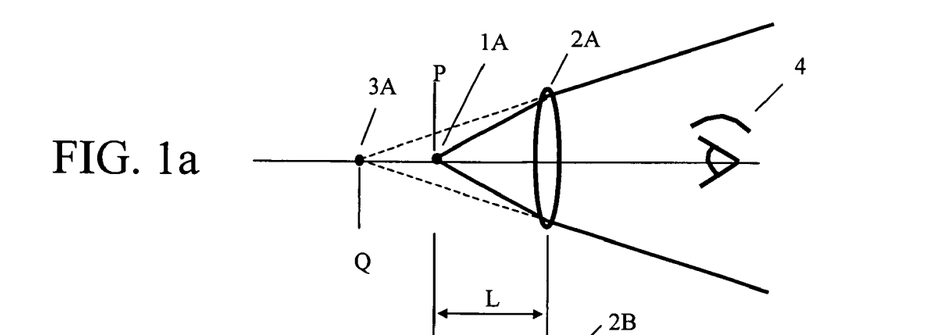
FIGS. 1a–1d are schematic diagrams showing how the depth of an image is changed as the focal length of a lens is changed.
Figure 1B:
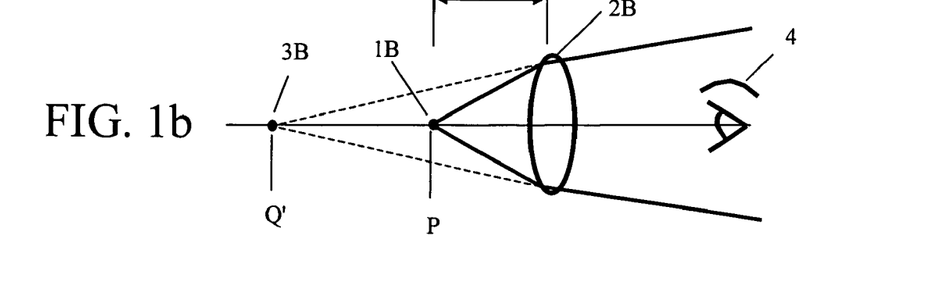

FIG. 1a shows that the light from an object 1A passes through a lens 2A and then diverges at a different angle. FIG. 1b is a similar diagram for a lens 2B having a shorter focal length. The light refracted by the lens 2A, 2B forms a virtual image 3A, 3B. When a viewer 4 sees the refracted light, the viewer perceives the object 1A, 1B, which is positioned at point P, as existing at point Q, Q'.

Figure 1C:
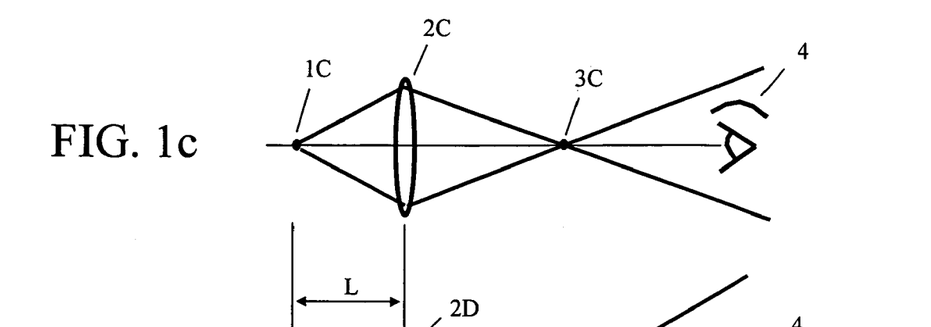
Figure 1D:
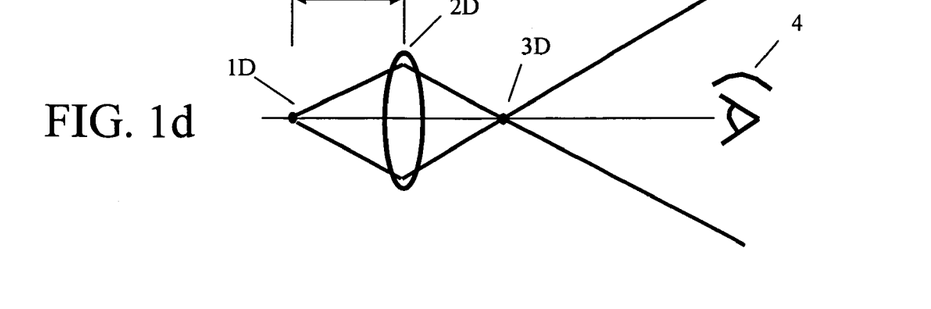

FIG. 1c shows that the light from an object 1C passes through a lens 2C and then converges to form a real image 3C. FIG. 1d is a similar diagram for a lens 2D having a shorter focal length. When the viewer 4 sees an object 1C, 1D through the lens 2C, 2D, the viewer perceives the object 1C, 1D as the real image 3C, 3D.

For a given distance L between the object and the lens, the position of the image formed by the lens varies depending on the focal length of the lens. The position of the image can be calculated with Gauss' Lens Formula. FIGS. 1a and 1b show that the virtual image 3A is nearer to the viewer 4 with the lens 2A having a longer focal length, and the virtual image 3B is farther from the viewer 4 with the lens 2B having a shorter focal length. FIGS. 1c and 1d show that the real image 3C is nearer to the viewer 4 with the lens 2C having a longer focal length, and the real image 3D is farther from the viewer 4 with the lens 2D having a shorter focal length.

FIGS. 1a–1d demonstrate that the position of a virtual or real image changes according to the focal length of a lens, and the position of the image will change continuously as the focal length varies continuously.

Figure 2:
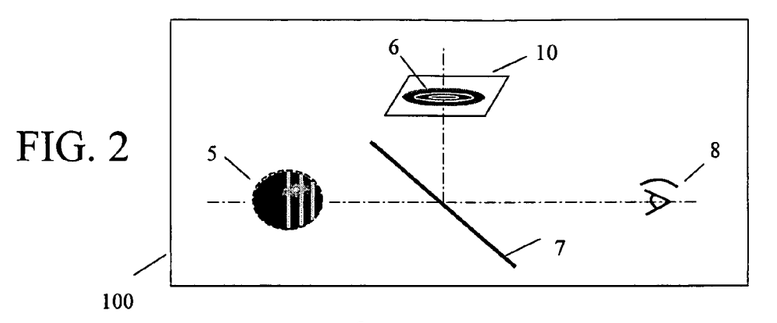
FIG. 2 is a schematic diagram showing a three-dimensional display device of the present invention.

FIG. 2 schematically shows a 3D (three-dimensional) display device 100 according to the first embodiment of the present invention. The 3D display device 100 includes a 2D (two-dimensional) display 10 displaying a first image 6, and a variable focusing lens 7 receiving light from the 2D display 10 and forming a second image 5. The variable focusing lens 7 changes its focal length so that the second image 5 looks three-dimensional for a viewer 8 of the three-dimensional display device 100.

A 3D image is generated in the space by imaging depthwise 2D images on corresponding depths in the space with the variable focusing lens. The 2D display displays only pixels that should be imaged at the same depth at a given moment or a given frame, and the variable focusing lens adjusts its focal length in order to image the depthwise image to the required location in the space.

Figure 3A:
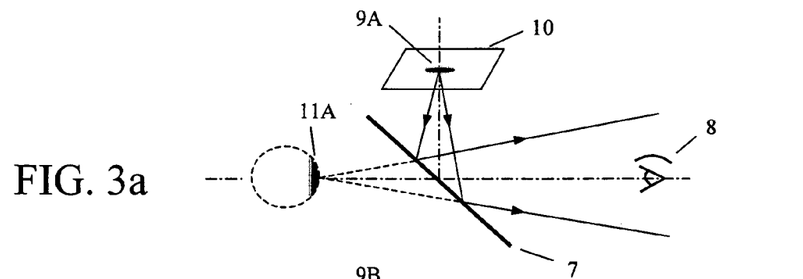
FIGS. 3a–3c are schematic diagrams showing display and focusing of depthwise images.
Figure 3B:
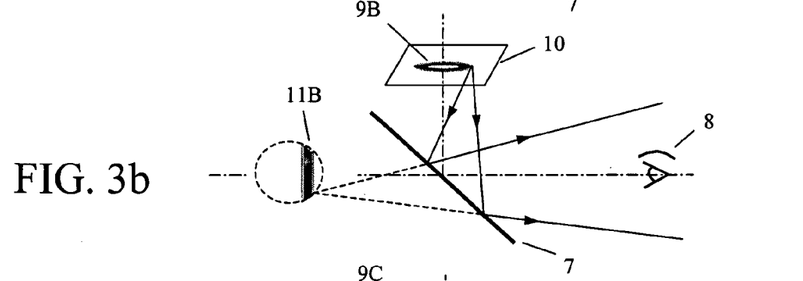
Figure 3C:
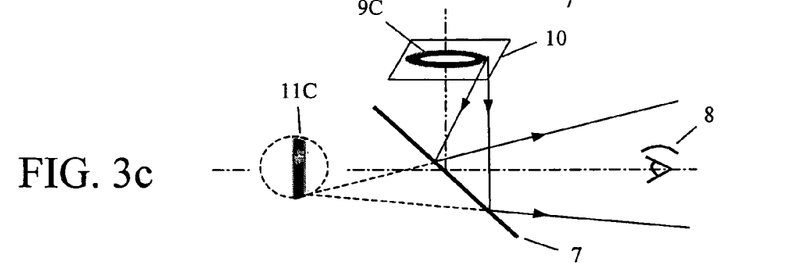

FIGS. 3a–3c show that the first image 6 includes a predetermined depth number of first depthwise images 9A, 9B, 9C that are displayed within a unit time, and the second image 5 includes corresponding second depthwise images 11A, 11B, 11C. Each of the first depthwise images 9A, 9B, 9C represents the portion of the first image 6 having the same image depth. The 2D display 10 displays one first depthwise image at a time. The focal length of the variable focusing lens 7 changes according to the depth of the first depthwise image being displayed. The focusing speed of the variable focusing lens 7 is at least equal to the product of the afterimage speed of the human eye and the number of depths so that the second image looks three-dimensional to the viewer. The variable focusing lens reflects light from the two-dimensional display.

In order that the sequentially displayed second depthwise images look as the three-dimensional second image 5 to the viewer 8, the second depthwise images must be displayed fast enough to utilize human eye's afterimage effect. That is, the variable focusing lens 7 must be able to change its focal length fast enough.

For example, to display a 3D image, afterimage speed of about 30 Hz is required. In order to display a three-dimensional image having 10 image depths, since the 10 depths must all be displayed within one thirtieth of a second, a variable focusing speed and 2D display speed of at least about 300 Hz (30×10 Hz) are required.

The number of image depths varies depending on the structure and capability of a three-dimensional display device, and increases for a better image quality.

The variable focusing lens 7 is made of a micromirror array lens. The micromirror array lens is synchronized with the 2D display 10 to display the second depthwise images 11A, 11B, 11C according to the depths of the first depthwise images 9A, 9B, 9C. To display the second image 5, which has continuous depths, the focal length of the micromirror array lens is synchronized with the depths of the first depthwise images 9A, 9B, 9C, and thus continuously changes. In order that the second image 5 which consists of the second depthwise images 11A, 11B, 11C, which have continuous depths, is displayed realistically, focal length change speed of the micromirror array lens, and the display speed of the 2D display 10 must be equal or greater than the product of the afterimage speed of the human eye, which is about 30 Hz, and the number of depths of the depthwise images.

Figures 4A, 4B:
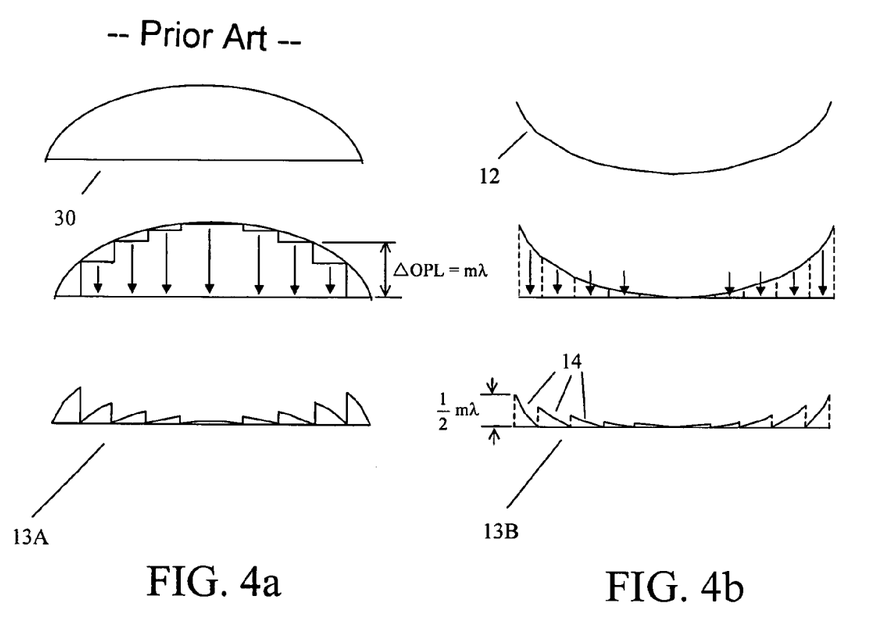
FIG. 4a is a schematic diagram showing how a refractive Fresnel lens replaces an ordinary single-bodied lens.
FIG. 4b is a schematic diagram showing how a reflective Fresnel lens replaces an ordinary single-bodied mirror.

FIG. 4a schematically shows how a refractive Fresnel lens 13A replaces an ordinary single-bodied lens 30. FIG. 4b shows how a reflective Fresnel lens 13B, replacing an ordinary single-bodied mirror 12, is formed with micromirror array lens. The micromirror array lens includes a plurality of micromirrors 14, and each micromirror 14 is controlled to form a reflective Fresnel lens 13B and to change the focal length of the variable focusing lens 7.

In order to obtain a bright and sharp image, all rays leaving one point of an object must converge with the same phase to one point of an image plane. Therefore, the roles of a lens are to converge the rays scattered by an object and make each ray having the same optical path length (OPL). Alternatively, the imaging using Fresnel lens can be achieved by giving each ray the same periodical phase, even though the rays have different OPLs, by adjusting the OPL difference to be integer multiples of the wavelength, λ. Each facet converges rays to one point and rays refracted or reflected by different facets have an OPL difference of integer multiples of λ.

To change the focal length of the micromirror array lens, the translational motion or the rotational motion of each of the micromirrors is controlled. Alternatively, both of the translational motion and the rotational motion of each of the micromirrors is controlled. The rotational motion of the micromirror 14 has the role of changing the direction of light, and the translational motion of the micromirror 14 has the role of adjusting the phase of the light.

Figure 5A:
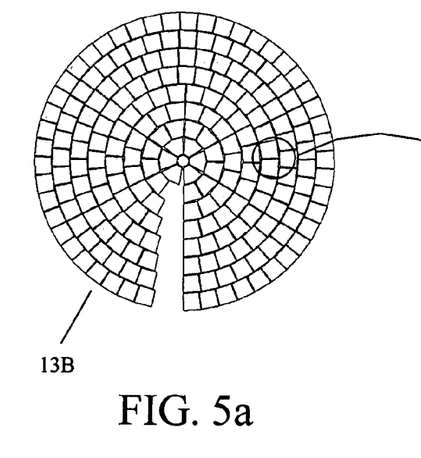
FIG. 5a is a schematic plan view showing a variable focusing lens that is made of many micromirrors.
Figure 5B:
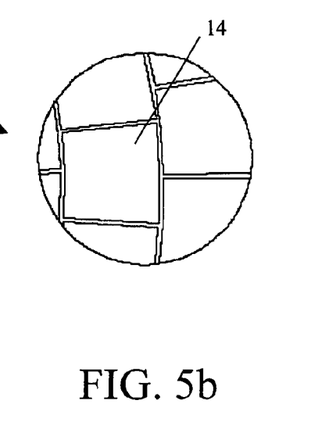
FIG. 5b is an enlarged detail plan view of the micromirrors.

FIGS. 5a and 5b show that the micromirrors 14 are arranged to form many concentric circles. The micromirrors 14 are arranged in a flat plane as shown in FIG. 4b.

The variable focusing lens 7 must meet the following requirements. First, it must have a focal length change speed fast enough for 3D display. Second, it must have a large range of numerical aperture change, since the depth range that can be imaged depends on the range of numerical aperture change. Third, it needs to have a large diameter depending on constructions of 3D displays.

The micromirror array lens meets the three requirements. First, the response speed of the micromirror 14 exceeds 10 KHz. Therefore, it is possible to make the focal length change speed of the micromirror 14 equal to or greater than 10 KHz.

Second, the range of numerical aperture change of the micromirror array lens is large. Therefore, as explained above, the micromirror array lens has a greater range of image depths, which is an essential requirement for a 3D display. For example, when a 19 inch 3D TV is made with the micromirror array lens, it can display image depth from 1 m to infinity.

Third, in contrast with a lens having a continuous shape, for which it becomes difficult to make an ideal curved surface as the size becomes larger, there is no difficulty in enlarging the size of micromirror array lens, since the micromirror array lens consists of discrete micromirrors.

Since the micromirror array lens is a reflective lens, the optical system of the three-dimensional display device 100 cannot be aligned in a line. An optical arrangement, in which the reflected light is not blocked by the 2D display, is required.

Figure 6:
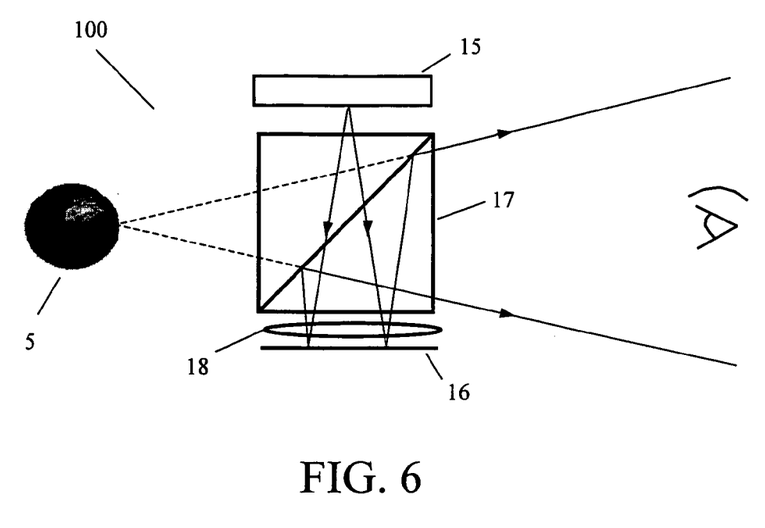
FIG. 6 is a schematic diagram showing a beam splitter and an auxiliary lens added to the three-dimensional display device.

FIG. 6 shows an arrangement in which the three-dimensional display device 100 further includes a beam splitter 17 positioned in the path of light between a 2D display 15 and a variable focusing lens 16. The 2D display 15 and the variable focusing lens 16 are arranged parallel with each other. The beam splitter 17 changes the direction of the light by 90°, and thus simulating an in line optical arrangement. The micromirror array lens is positioned orthogonal to the light path.

Alternatively, referring back to FIG. 2, the variable focusing lens 7 is positioned so that the path of the light reflected by the variable focusing lens 7 is not blocked by the two-dimensional display 10. The arrangement in FIG. 2 has advantages of simple structure and wider field of view since the distance between the two-dimensional display and the variable focusing lens 7 is closer that that of the arrangement with the beam splitter 17. However, it has a disadvantage of reduced image quality due to aberration induced by the obliquely positioned variable focusing lens 7. The choice of either arrangement depends on the use of the display device.

As shown in FIG. 6, the three-dimensional display device 100 may further include an auxiliary lens 18 having a predetermined focal length and positioned adjacent to the variable focusing lens 16. The second image 5 is formed by the effective focal length of the variable focusing lens 16 and the auxiliary lens 18. With the auxiliary lens 18, the variable focusing range of the three-dimensional display device 100 can be extended or changed to a desired range. The auxiliary lens 18 may be a refractive type Fresnel lens.

Figure 7:
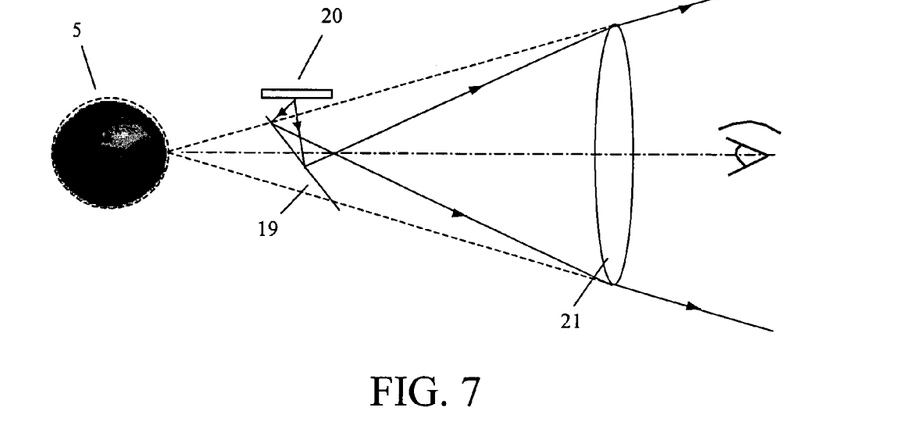
FIG. 7 is a schematic diagram showing a magnifying lens added to the three-dimensional display device.

As shown in FIGS. 2 and 6, the variable focusing lens 7, 16 should have the size of the screen. For a device having a large display screen, it is almost impossible or extremely expensive to make a variable focusing lens having a size as large as that of the screen. FIG. 7 shows that the three-dimensional display device 100 may further include an auxiliary lens 21 that magnifies the second image 5, in order to overcome this limitation. The auxiliary lens 21 may be an ordinary refractive lens or a refractive Fresnel lens. The screen size becomes the size of the auxiliary lens 21, which has a fixed focal length. A 2D display 20 and a variable focusing lens 19 have a compact size that is much smaller than the size of the auxiliary lens 21. The effective focal length of the three-dimensional display device 100 is varied by changing the focal length of the variable focusing lens 19.

The focal length of the variable focusing lens 7 may be controlled to be fixed. By fixing the focal length of the variable focusing length 7 and operating the 2D display 10 as a general 2D display device, the 3D display device 100 can be easily converted into a 2D display device.

Method for displaying a three-dimensional image may be one using a virtual image as illustrated in FIGS. 1a and 1b, or one using a real image as illustrated in FIGS. 1c and 1d. The method using a real image has an advantage that it enables more realistic display since the image is generated closer to the viewer, and has a disadvantage that the range of display is limited between the viewer and the screen. With the method using a virtual image, the image is generated behind the screen. This method has an advantage that it can display an image having depth ranging from the screen to the infinity.

Figure 8A:
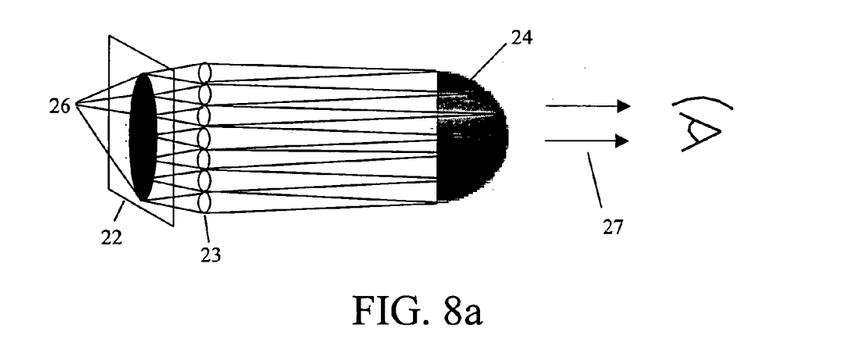
FIG. 8a is a schematic diagram showing a 3D display device, which has variable focusing lenses corresponding to pixels of a 2D display.
Figure 8B:
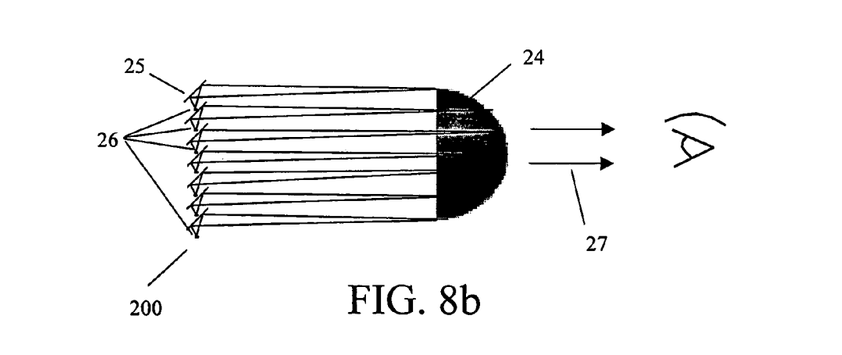

FIGS. 8a and 8b shows a second embodiment of the present invention. FIG. 8a shows how a 3D display device, which has variable focusing lenses 23 corresponding to pixels 26 of a 2D display 22, operates to display a three-dimensional image 24. The partial image displayed by each pixel 26 is imaged at its image depth by the variable focusing lens 23 corresponding to the pixel 26. Since the partial image displayed by each pixel is individually handled by the corresponding variable focusing lens, dividing an image into depthwise images and displaying the depthwise images are not required, and thus this embodiment does not need a high speed 2D display and a high speed variable focusing lens. A 2D display having a usual speed can be used. The size of the variable focusing lens 23 is similar to that of the pixel 26.

FIG. 8b shows schematically a 3D display device 200. The 3D display device 200 includes a 2D display having a plurality of pixels 26, and a plurality of variable focusing lenses 25. Each of the variable focusing lenses 25 corresponds to each of the pixels 26. The focusing speed of the variable focusing lens 25 is at least equal to the afterimage speed of the human eye, and each of the variable focusing lenses 25 reflect light from the two-dimensional display. The focal length of each of the variable focusing lenses 25 changes according to the image depth of an image displayed by each of the pixels 26. Each of the variable focusing lenses 25 is made of a micromirror array lens.

Since the micromirror array lens is a reflective optical element, the lens element 25 is positioned so that the reflected light is not blocked by the two-dimensional display. Each of the pixels 26 displays a portion of a first image in a direction orthogonal with the device display direction 27 of the 3D display device 200. Each of the lens elements 25 is positioned at an angle of 45° with respect to the display direction of the pixels 26 and the device display direction 27. A second image 24, which is three-dimensional, is formed by the lens elements 25. Notwithstanding this complex arrangement, micromirror array lens is used because its range of numerical aperture change is large.

Figure 9:
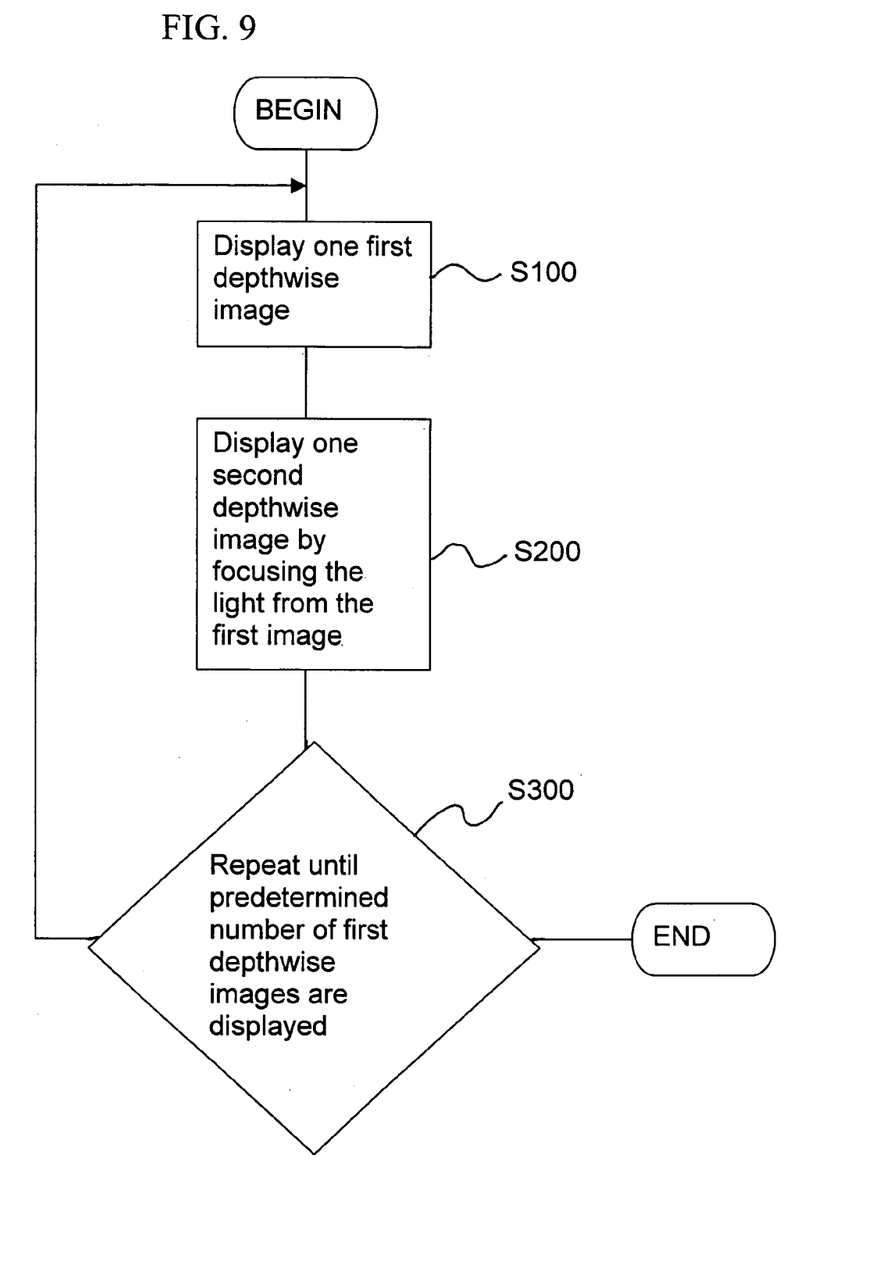
FIG. 9 is a flow diagram showing a three-dimensional display method of the present invention.

FIG. 9 shows a three-dimensional display method according to the invention. In step S100, a first depthwise image is displayed in two-dimension. Then in step S200, a second depthwise image is displayed by receiving light from the displayed first depthwise image and focusing the light according to the depth of the first depthwise image. In step S300, steps S100 and S200 are repeated for a predetermined number of the first depthwise images within a unit time. The predetermined number of the first depthwise images forms a first image, and each of the first depthwise images represents the portion of the first image having the same image depth. The displayed second depthwise images form a second image that looks three-dimensional for a viewer. The focusing speed in the step of displaying the second depthwise image is at least equal to the product of the afterimage speed of the human eye and the number of depths. In the step of displaying the second depthwise image, the light received from the displayed first depthwise image is reflected.

The step of displaying the second depthwise image, S200 is performed with a micromirror array lens.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A volumetric three-dimensional display device for displaying an object comprising:
   a) a display means for presenting two-dimensional images (first images), wherein the two-dimensional images are the image representatives of the cross section of the object at different positions along the third dimension,; and
   b) a Micromirror Array Lens receiving light from the display means and forming a three-dimensional image by imaging two-dimensional images (second images); wherein the Micromirror Array Lens is a Diffractive-Reflective Hybrid Fresnel Variable Focusing Lens, wherein the changing rate of the focal length is at least equal to the product of a number of cross-sectional images times persistence rate (afterimage speed) of average human eye so that the two-dimensional images with different imaging planes appear to fuse into a three-dimensional image of an object to a viewer, wherein the focal length of the Micromirror Array Lens is controlled to change imaging planes of the two-dimensional images along the third dimension.

2. The three-dimensional display device of claim 1, wherein the micromirror array lens comprises a plurality of micromirrors, and wherein each micromirror is controlled to change the focal length of the variable focusing lens.

3. The three-dimensional display device of claim 1, further comprising a beam splitter positioned in the path of light between the two-dimensional display and the variable focusing lens.

4. The three-dimensional display device of claim 1, wherein the variable focusing lens is positioned so that the path of the light reflected by the variable focusing lens is not blocked by the two-dimensional display.

5. The three-dimensional display device of claim 1, further comprising an auxiliary lens having a predetermined focal length, and wherein the second image is formed by the variable focusing lens and the auxiliary lens together.

6. The three-dimensional display device of claim 1, wherein the focal length of the variable focusing lens is controlled to be fixed.

7. The three-dimensional display device of claim 2, wherein the micromirrors are arranged in a flat plane, wherein the micromirrors are arranged to form one or more concentric circles.

8. The three-dimensional display device of claim 2, wherein the translational motion of each of the micromirrors is controlled.

9. The three-dimensional display device of claim 2, wherein the rotational motion of each of the micromirrors is controlled.

10. The three-dimensional display device of claim 2, wherein the rotational motion and the translational motion of each of the micromirrors are controlled.

11. The three-dimensional display device of claim 5, further comprising a screen for displaying the second image, and wherein the auxiliary lens increases the size of the screen.

12. The three-dimensional display device of claim 1, the micromirror array lens is synchronized with the two-dimensional display to display the two-dimensional first images according to its depths.

* * * * *